United States Patent [19]

Sander et al.

[11] Patent Number: 4,916,556

[45] Date of Patent: Apr. 10, 1990

[54] DISK DRIVE CONTROLLER

[75] Inventors: Wendell Sander; Brian Sander, both of Campbell, Calif.

[73] Assignee: Apple Computer, Inc., Cupertino, Calif.

[21] Appl. No.: 280,665

[22] Filed: Dec. 6, 1988

Related U.S. Application Data

[62] Division of Ser. No. 55,443, May 28, 1987.

[51] Int. Cl.$^4$ ............................................. G11B 5/09
[52] U.S. Cl. ..................................................... 360/45
[58] Field of Search ............................. 360/45, 51, 40

[56] References Cited

U.S. PATENT DOCUMENTS

| | | | |
|---|---|---|---|
| 4,081,756 | 3/1978 | Price et al. ............................ | 360/45 |
| 4,281,356 | 7/1981 | Sousa ..................................... | 360/45 |
| 4,327,383 | 4/1982 | Holt ...................................... | 360/45 |
| 4,344,093 | 8/1982 | Huber ................................... | 360/45 |

Primary Examiner—Vincent P. Canney
Attorney, Agent, or Firm—Blakely, Sokoloff, Taylor & Zafman

[57] ABSTRACT

The invented controller uses a programmable parameter scheme which makes it possible to read and write 3½ inch variable and fixed speed drives, as well as standard 5¼ inch drives. Additionally, the present invention uses a plus/minus rate multiplier to correct for symmetry and frequency errors. Also provided is a form of read post compensation which corrects for peak shift effects on disks with insufficient precompensation. Other advanced features of the present invention include the use of half clock circuits to provide half clock resolution in the signal being written to and read from the disk and the capability of operating at continuously variable clock speeds and data rates dynamically programmable by the computer.

2 Claims, 13 Drawing Sheets

4,916,556

DISK DRIVE CONTROLLER

This is a division of application Ser. No. 055,443, filed May 28, 1987.

SUMMARY OF THE INVENTION

An integrated disk controller chip is disclosed which is designed to read and write Manchester ("MFM") and Group Code Recording ("GCR") formatted disks and other formats under program control.

The invented controller uses a programmable parameter scheme which makes it possible to read and write 3½ inch variable and fixed speed drives, as well as standard 5¼ inch drives.

Thus, with the present invention, it is possible to read and write both MFM formatted disks, such as used by IBM personal computers and GCR formatted disks, such as used by Apple personal computers on the same disk drive. It is also possible to write MFM format on a 3½ inch variable speed drive in such a way that it can be read back on fixed speed 3½ inch drives.

The invented controller provides the ability to perform write precompensation to correct for peak shift effects which occur in magnetically stored media.

Also provided is a form of read post compensation which corrects for peak shift effects on disks with insufficient precompensation. A two byte read and write FIFO is used to provide software flexibility.

The invented controller allows the phase lines to be programmed as either inputs or outputs which makes it possible to interface with a wide variety of drives. Additionally, rather than using a fixed rate multiplier, as frequently employed in prior art controllers, the present invention uses a plus/minus rate multiplier to correct for symmetry and frequency errors. Other advanced features of the present invention include the use of half clock circuits to provide half clock resolution in the signal being written to disk and the capability of operating at continuously variable clock speeds and data rates dynamically programmable by the computer.

DETAILED DESCRIPTION OF THE INVENTION

Figure 1:
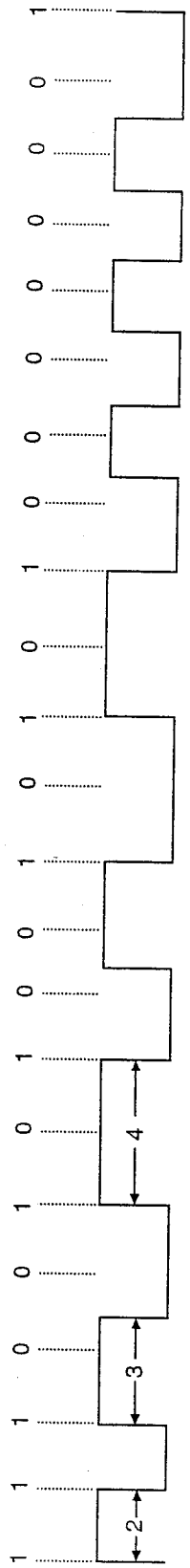
FIG. 1 shows a particular pattern of 1's and 0's in MFM format.

Although the present invention uses various codes for reading from and writing data to disks, it will be described with reference to the most frequently utilized coding scheme, namely Manchester or MFM code. The MFM code follows two basic rules: first, a transition occurs any time that a one is encountered in the data pattern; and second, a transition occurs between any two adjacent zeroes. As shown in FIG. 1, MFM code produces a series of 2, 3 and 4 unit distances (cells) between transitions which, based on the these distances, when read back, can be resolved into the actual data represented. Details regarding the reading and writing of GCR formatted disks may be found in U.S. Pat. No. 4,210,959 and copending application Ser. No. 943,839.

In the following description, numerous specific details are set forth such as specific word or byte lengths, etc., to provide a thorough understanding of the present invention. However, it will be obvious to one skilled in the art that the present invention may be practiced without such specific details. In other instances, well known circuits have been shown in block diagram form in order not to obscure the present invention in unnecessary detail.

MFM Sector Format

The concept of writing 2, 3 and 4 unit cells provides the mechanism by which the data is translated and written on the disk. But there must be some method for organizing the data so that a specific group of data can be easily located. This is done by writing the data in a sector format. A sector consists of (1) information which allows a controller to find the start of the sector, (2) details about which sector is being read, (3) which side of the disk is being read, (4) which track is being read (a track is a group of sectors), (5) the length of the sector, and (6) cyclical redundancy check (CRC) error detection information. Table 1 shows the organization of an MFM sector.

TABLE 1

| | NO. OF BYTES | DATA WRITTEN |
|---|---|---|
| | *80 | 4E |
| | *12 | 00 |
| TRACK ID | *3 | C2 (Mark Byte) |
| | *1 | FC (Index Mark) |
| | *50 | 4E |
| | 12 | 00 |
| | 3 | A1 (Mark Byte) |
| | 1 | FE (ID Address Mark) |
| SECTOR ID | 1 | TRACK NUMBER |
| | 1 | SIDE NUMBER |
| | 1 | SECTOR NUMBER |
| | 1 | SECTOR LENGTH |
| | 2 | CRC INFORMATION |
| | 22 | 4E |
| | 12 | 00 |
| | 3 | A1 (Mark Byte) |
| DATA FIELD | 1 | FB (Data Address Mark) |
| | 256 | DATA |
| | 2 | CRC INFORMATION |
| | 54 | 4E |
| | **1- | 4E |

*These bytes are only written at the beginning of a track.
**These bytes are only written at the end of a track.
Note: The sector ID and data field bytes are repeated for each sector on a track.

The beginning of a track or sector consists of a number of bytes of 4E's (hexidecimal) which serve as a buffer zone between regions of meaningful information. The next bytes in the pattern that are written are twelve bytes of zeroes (2 unit cells), known as the "bytes of zeroes". These bytes are used to locate the beginning of either a track, a sector ID or a sector data field. Following the bytes of zeroes are three mark bytes. A mark byte is a special byte containing a pattern which violates the basic rules of MFM (i.e., has a missing transition). This illegal pattern can be recognized, and provides two very important functions: first, since it is always in the byte that follows the bytes of zeroes, it serves as verification that the zeroes are indeed the beginning of a track, sector ID or sector data field and not data (1's and 0's) in a data field and second, the mark byte provides a reference point or synchronization from which the MFM rules may be applied to decode the data. (Without synchronizing on a known pattern, it is impossible to tell the difference between a string of 1's and a string of 0's.) After the mark byte, the next byte encountered in the format pattern is the information byte. This byte is used to determine whether the region being read is the track information, the sector ID, or the sector data field. The next four bytes in the sector ID contain the track number, side number, sector number and sector length.

The next bytes are the cyclical redundancy checks or CRC bytes which are used to detect errors according to well-known techniques.

With the basic concepts of the MFM pattern and MFM sectors in mind, the functions and structure of the invented controller will now be set forth, namely how it handles the problems of reading, writing and interfacing with a processor.

Figure 2:
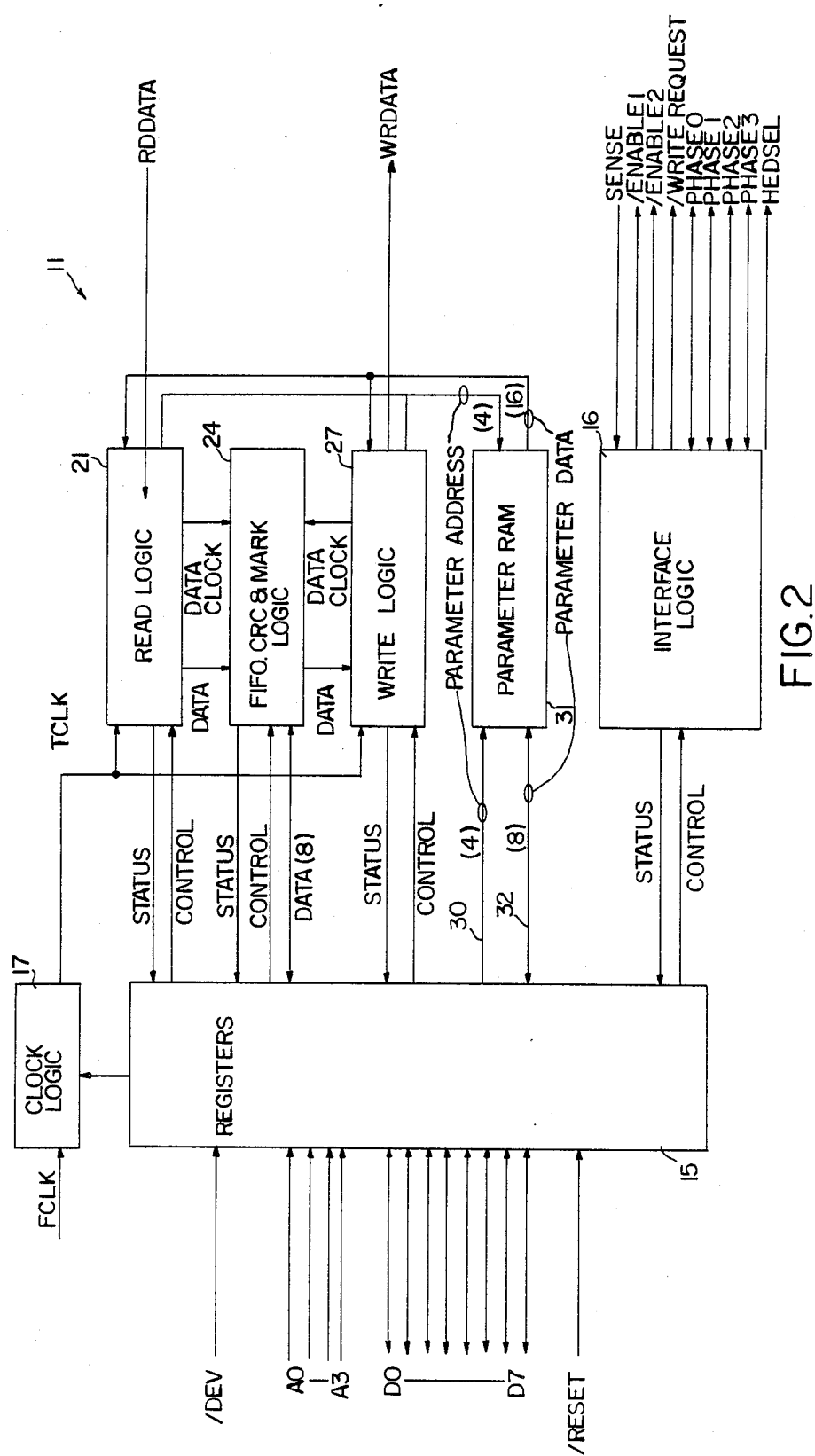
FIG. 2 is an overview block diagram of the invented controller.

An overview block level diagram of the invented controller is shown in FIG. 2. Controller 11 comprises register block 15 which serves as an interface between the processor and the controller logic; interface logic 16 which serves as an interface between the controller and one or more disk drives; clock logic 17, which generates a signal TCLK used by the controller from the signal FCLK generated by the processor; read logic 21; FIFO, CRC and mark logic 24; write logic 27; and parameter RAM 31. The device select signal $\overline{DEV}$ must be asserted by the processor in order for the controller to utilize the signals on address lines A0–A3 and data lines D0–D7. The controller is reset whenever the processor asserts $\overline{RESET}$.

Register Block 15

Register block 15 comprises registers which may be accessed by the processor and by the controller logic. Some of the registers are read only, some are write only and some are read/write. In this connection, from a software point of view, there are a total of sixteen eight bit registers as follows: data register (read/write); mark register (read/write); error register (read); write CRC register (write); parameter data register (read/write); phase register (read/write); setup register (read/write); handshake register (read); mode register zeroes (write); mode register ones (write); and read status register (read).

Data Register

The data register is the location where data is read from or written to a FIFO in FIFO, CRC and mark logic 24. If a mark byte is read from this location, an error will occur. A read from this location when Action (data bit 3 in the mode register) is not set, will provide two bytes of error correction information. The register is set up to toggle between the two bytes on successive reads, thus providing both bytes of information. If there is still valid data to be read when Action is not set, it can be read by reading the mark register.

Mark Register

This location is used for reading and writing mark bytes. Writing to this location will cause the missing transition between two zeroes to occur. Reading from this location will allow a mark byte to be read without causing an error.

Error Register

This location provides information on the type of error that has occurred. If any of its bits are set, an error flag will be set in the handshake register as described below. Once any error bit has been set, no other error bit can be set until the register is cleared. Reading the error register will cause the register to clear. This register must be cleared prior to beginning a read or write operation. The possible error conditions are as follows.

In write mode, when bit $0=1$, the FIFO is being underrun by the processor. In other words, the FIFO is empty and the processor has not acknowledged the handshake by writing another byte. In read mode, when bit $0=1$, the FIFO has two bytes to be read, but the processor is not reading them fast enough.

When bit $1=1$, a byte which was read from the data register was a mark byte.

In write mode, when bit $2=1$, the processor is writing faster than the FIFO is requesting bytes. In read mode, when bit $2=1$, the processor is reading bytes faster than they are available.

When bit $3=1$, the correction number obtained in the correction state machine (described in conjunction with FIG. 5 hereinbelow) is so large that the error cannot be corrected.

When bit $4=1$, the transition occurred before the first short counter (SCT) pulse (described in conjunction with FIG. 4 below) which indicates that the cell was too narrow to be a legal cell.

When bit $5=1$, the fourth SCT pulse occurred before the transition which implies that the transition was too wide to be a valid cell.

When bit $6=1$, there were three marginal transitions in a row which implies that the transitions cannot be resolved.

Bit 7 of the error register is not used.

Write CRC Register

A write to the CRC register will set a status bit in the FIFO which will cause the CRC bytes to be written on the disk.

Since the status bit moves through the FIFO, the CRC bytes will shift out after the last bit of data is written.

Parameter Data Register

The parameter data register is where sixteen bytes of parameter data from parameter RAM 31 are written and read. This register comprises a counter which increments the address parameter RAM 31 each time a write or read to the register occurs. The sixteen bytes of data can be written or read by successively writing to or reading from this register. Thus, the four bit address placed on parameter address line 30 accesses sixteen locations in RAM 31 and the data from the accessed location is placed on the eight bit parameter data bus 32. The increment counter presets the addresses to zero each time a write to the mode register zeros occurs. The data is stored in RAM 31 in the following sequence (the meanings of the various parameters will be set forth below):

| RAM Address | Parameter |
|---|---|
| 0000 | MIN CELL TIME (MIN) |
| 0001 | CORRECTION MULTIPLIER (MULT(K)) |
| 0010 | SSL |
| 0011 | SSS |
| 0100 | SLL |
| 0101 | SLS |
| 0110 | RPT |
| 0111 | CSLS |
| 1000 | LSL |
| 1001 | LSS |
| 1010 | LLL |
| 1011 | LLS |
| 1100 | EARLY/NORM |
| 1101 | TIME0 |
| 1110 | LATE/NORM |
| 1111 | TIME1 |

The MIN parameter is the minimum number of clocks needed to determine a valid transition.

The MULT(K) parameter is a weighting factor for normalizing drive speed to an ideal speed. The SSL, SLL, SLS, RPT, CSLS, LSL, LSS, LLL and LLS parameters are eight bit fields used during post compensation. The EARLY/NORM and LATE/NORM parameters are eight bit fields used during precompensation (four bits for each of EARLY, LATE and NORM.) TIME1 is an eight bit field containing the time delay associated with a transition sent to the drive. TIME0 is an eight bit field containing the additional time delay associated without sending a transition to the drive. TIME1 and TIME0 are 7 bits long. The low order bit of each (HLFBIT) is used by the half write logic, to lengthen WRDATA by one-half clock when desired.

Each of the foregoing parameters is dynamically programmable by the computer. In this manner, the controller can be programmed to run at a clock speed and data rate determined by the computer. Such programmable parameters enable the controller to interchangeably read and write constant angular velocity drives and constant linear velocity drives.

Phase Register

The phase register is used to read and write the four phase lines (phase 0, phase 1, phase 2 and phase 3) which are used to control or read status from the disk drive. The four phase lines can be independently programmed as either inputs or outputs depending on the state of the other four bits in the register. The phase lines default to low outputs on reset. The function of each of the eight bits in the phase register is as follows:

Bit 0 is used to set the polarity of the phase 0 line when programmed as an output.
Bit 1 is used to set the polarity of the phase 1 line when programmed as an output.
Bit 2 is used to set the polarity of the phase 2 line when programmed as an output.
Bit 3 is used to set the polarity of the phase 3 line when programmed as an output.
Bit 4=0 indicates that the phase 0 line is an input.
Bit 4=1 indicates that the phase 0 line is an output.
Bit 5=0 indicates that the phase 1 line is an input.
Bit 5=1 indicates that the phase 1 line is an output.
Bit 6=0 indicates that the phase 2 line is an input.
Bit 6=1 indicates that the phase 2 line is an output.
Bit 7=0 indicates that the phase 3 line is an input.
Bit 7=1 indicates that the phase 3 line is an output.

Setup Register

The setup register is used to set the controller into its various modes. This register will reset to all zeroes when a reset occurs. The function of each of the eight bits in the register is as follows:

Bit 0=1 will cause HEDSEL to be output
Bit 1=0 3.5 inch drive not selected
Bit 1=1 3.5 inch drive selected
Bit 2=0 normal operation.
Bit 2=1 sets the controller into GCR mode.
Bit 3=0 normal operation.
Bit 3=1 causes the internal clock frequency to be divided by two.
Bit 4=0 disables the correction state machine.
Bit 4=1 enables the correction state machine.
Bit 5=0 sets up the read and write signals for Apple type drives.
Bit 5=1 sets up the read and write signals for IBM type drives.
Bit 6=0 normal operation.
Bit 6=1 causes the read and write data transformation logic (described below) to be bypassed. This bit must be set whenever the GCR or 3.5 inch drive modes are set.
Bit 7=0 will produce no timeout when turning off Motoron (mode register, bit 7).
Bit 7=1 causes the Motoron bit to stay on for $\frac{1}{2}$ second (at 16 Mhz) after the drive is disabled.

Handshake Register

The handshake register performs the following functions.

When bit 0=1 the next byte to be read from the FIFO is a mark byte.

When bit 1=0, the CRC register became all zeroes when the second CRC byte passed through the register. This bit is valid when the second CRC byte is the next to be read from the FIFO.

Bit 2 is used to read the read data signal from the drive.

Bit 3 is used to read the SENSE input from the drive.

Bit 4 is used to read the status of Motoron (Mode Register bit 7.

Bit 5=1, indicates one of the bits in the error register has been set to a one. This bit is cleared by reading the error register.

When bit 6=1, in write mode, there are two bytes of available space in the FIFO. In read mode, when bit 6=1, there are two bytes to be read from the FIFO.

When bit 7=1, in write mode, there is one byte of available space in the FIFO. In read mode, when bit 7=1, there is one byte to be read from the FIFO.

Mode Register (Write Zeroes and Write Ones)

The mode register is used to set the various status bits of the controller. A bit can be set to zero by writing to the Write Zeroes location with the corresponding bit set to a one. A bit can be set to a one by writing to the Write Ones location with the corresponding bit set to a one. This scheme is used in order to make it possible to modify a particular bit without having to rewrite the entire register. The register is cleared to zeroes when a reset occurs. The Action bit (bit 3) will be cleared anytime there is any error while writing.

Bit 0 is used to clear the FIFO. This bit must be set and then cleared on successive operations. Read or Write mode (bit 4) must be established prior to setting bit 0 since the FIFO will clear to opposite states depending upon whether a write or read operation is about to take place.

When bit 1=0, drive 1 is not enabled.

When bit 1=1, drive 1 is enabled.
When bit 2=0, drive 2 is not enabled.
When bit 2=1, drive 2 is enabled.
When bit 3=0, Action is not set.
When bit 3=1, Action is set.
Bit 3 is used to start the read and write operation. This bit should only be set after everything else has been setup. When writing, two bytes of data should be written into the FIFO prior to setting this bit in order for the FIFO to start shifting immediately.
When bit 4=0, the controller is placed into Read mode.
When bit 4=1, the controller is placed into Write mode.
When bit 5=0, the side 0 head is selected (HEDSEL is reset.)
When bit 5=1, the side 1 head is selected (HEDSEL is set.)
Bit 6 is not used and always reads back as set.
When bit 7=0, Motoron is disabled.
When bit 7=1, $\overline{\text{Enable1}}$ and $\overline{\text{Enable2}}$ signals are asserted, for enabling drive 1 and drive 2. This bit must not be cleared until after the Action bit is cleared.

Read Status Register

This register is used to read back the status of the mode register.

The registers in register block 15 communicate with the other blocks in controller 11 by signals on the various STATUS (for inputs) and CONTROL lines (for outputs), as will be set forth in detail below.

Interface Logic 16

The registers in register block 15 communicate with the drive by signals on the STATUS lines (for inputs) and CONTROL lines (for outputs) using conventional and well known techniques.

Clock Logic Block 17

The inputs to clock logic block 17 are the system clock signal FCLK from the processor which typically is a 7–24 Mhz clock and a signal from register block 15 which causes the clock to run at its full speed or half speed (bit 3 of the Setup Register). Clock logic block 17 outputs the clock signal TCLK which is used by the invented controller. Thus, TCLK is either FCLK or one-half of FCLK.

Read Logic Block 21

Figure 3:
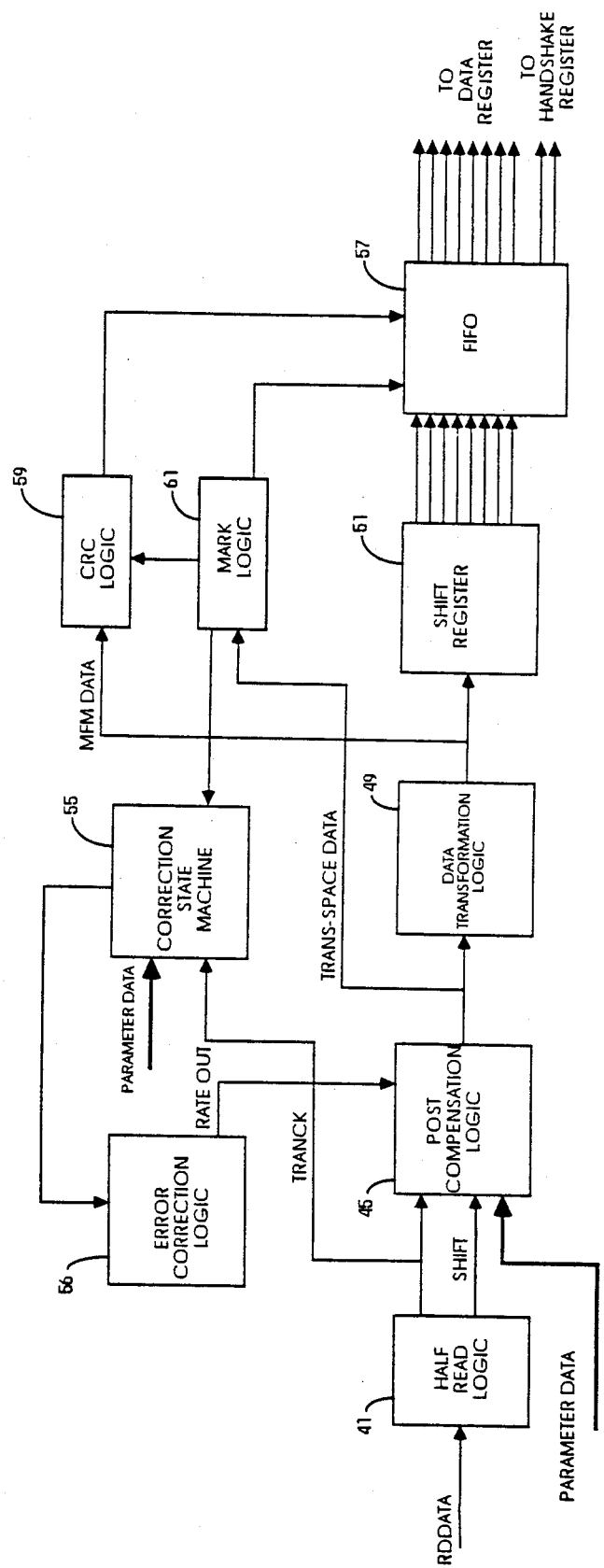
FIG. 3 is an overview block diagram of read logic 21.

FIG. 3 is an overview block diagram of read logic 21, including the applicable portions of FIFO, CRC and mark logic block 24 which are shared with write logic block 27.

Data is read from a disk by means of a signal called RDDATA generated by the drive as the read head passes over the magnetic media. This signal consists of pulses which are spaced at 2, 3 and 4 units apart, which of course is the data in its MFM translated form. If all conditions were ideal, to convert the MFM formatted data into its actual data, it would be a relatively simple matter to determine whether a cell is 2, 3, or 4 units long, then decode the data, and transfer the data through a serial to parallel shift register for use by the processor. However, conditions are rarely, if ever, ideal. A first problem is known as peak shift which occurs due to the non-ideal nature of the properties of magnetic media. Specifically, it is known that a 2 unit cell on a disk is crowded together more than a 3 or a 4 unit cell, in a relative sense. The effect of this crowding is that 2 unit cells will tend to push out their transitions into the region of a 3 or 4 unit cell, when a 2 unit cell is adjacent to a 3 or 4 unit cell. This pushing out causes such a 2 unit cell to be longer than it should be, and a 3 or 4 unit cell to be shorter than it should be when the data is read back.

When the data is written, it is known in the art to use a technique known as precompensation to correct for this problem, wherein a transition is caused to occur earlier or later when writing. That is, precompensation makes 4 and 3 unit cells longer and 2 unit cells shorter when they are next to each other during disk writes.

However, if the disk that is being read was not written by a controller which uses precompensation, or the precompensation used was not enough, errors may occur reading back the data due to effects of peak shift. This problem is solved in the present invention by using post compensation which will be described in detail below. Other problems that can occur are that the speed of the disk drive or the frequency of the clock can be off, or there can be some other form of systematic error in the data. Such errors can also make it very difficult to read back the data reliably. Such errors are corrected in the present invention by use of a correction state machine. The discussion of the read logic will set forth how the post compensation and correction state machine work, along with a description of how the beginning of a track or sector is located, how the mark byte is detected, and what starts the process of transferring data into the FIFO.

Read logic block 21 comprises half read logic 41, post compensation logic 45, data transformation state machine 49, shift register 51, correction state machine 55 and error correction logic 56. Also shown in FIG. 3 are FIFO 57, CRC logic 59 and mark logic 61, which elements are from FIFO, CRC and mark logic block 24, as shown in FIG. 2.

Half Read Logic 41

Half read logic 41 causes 2 unit cell, 3 unit cell and 4 unit cell input signal RDDATA which is asynchronous with respect to the internal clock TCLK to become synchronous with TCLK and transformed so that each RDDATA pulse is precisely one TCLK wide. The synchronized and transformed output is referred to herein as TRANCK.

In particular, half read logic 41 detects whether a RDDATA pulse occurred in the first or second half of the clock cycle thereby providing half clock resolution of the input pulse. Depending on the combination of which half of the clock cycle the current RDDATA pulse occurred in, and in which half the previous RDDATA pulse occurred in, there might have been an error in resolving RDDATA into TRANCK. Thus, the half read logic will stretch the bounds which are determining the cell time by one clock. This will effectively shorten the distance between TRANCK pulses by one clock, thereby correcting for the error in the one clock sample time.

If the cell times of the data coming from drive are very accurate, there is no problem resolving the data because the parameters can be set to fit in the middle of each region and there is sufficient margin between the SCT and LCT pulses generated by SCT and LCT counters (described below with the description of FIG. 5) and TRANCK pulses. However, in reality due to drive and noise error there can be some error in the values of the cell times. This can cause the SCT and LCT pulses and the TRANCK pulses to fall very close to each other making it difficult to tell the difference between two different cell times.

Figure 4A:
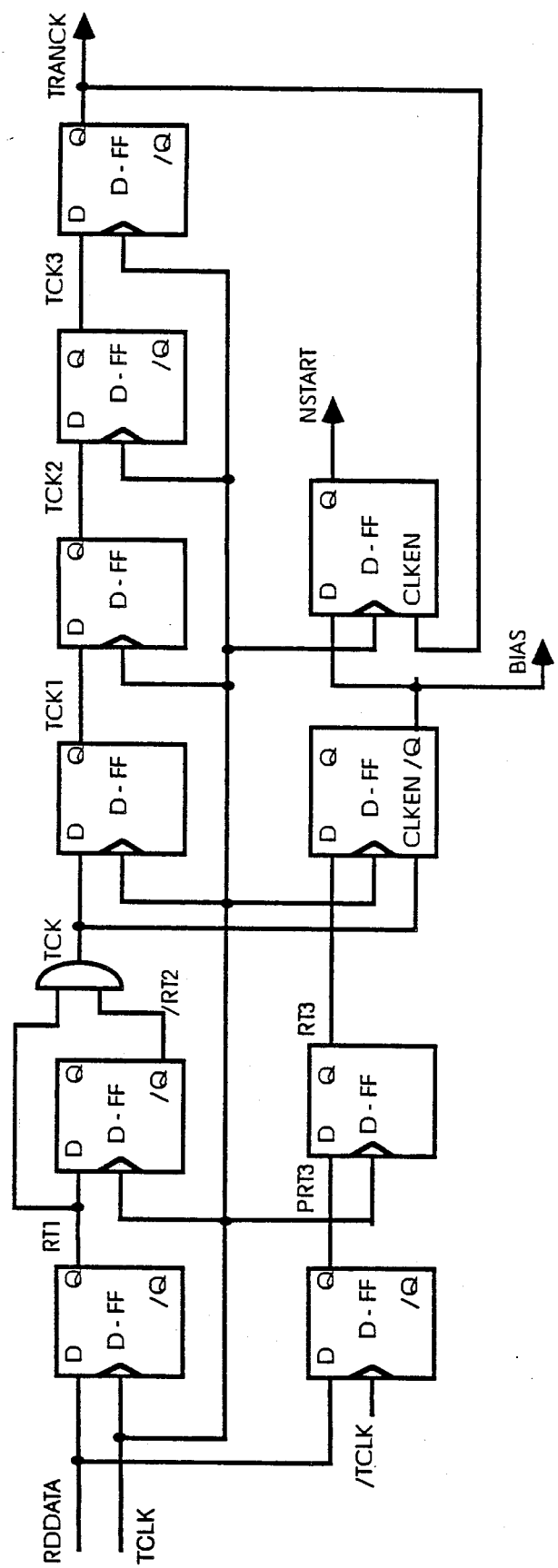
FIG. 4a is logic diagram showing a portion of half read logic 41.
Figure 4B:
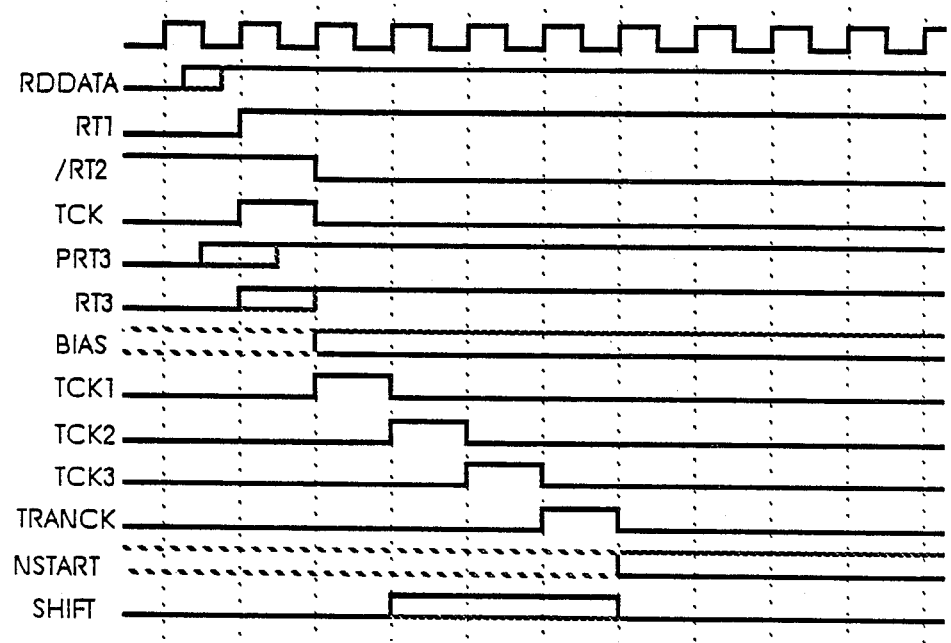
FIG. 4b is a graphical representation of the signals generated by half read logic 41.
Figure 4C:
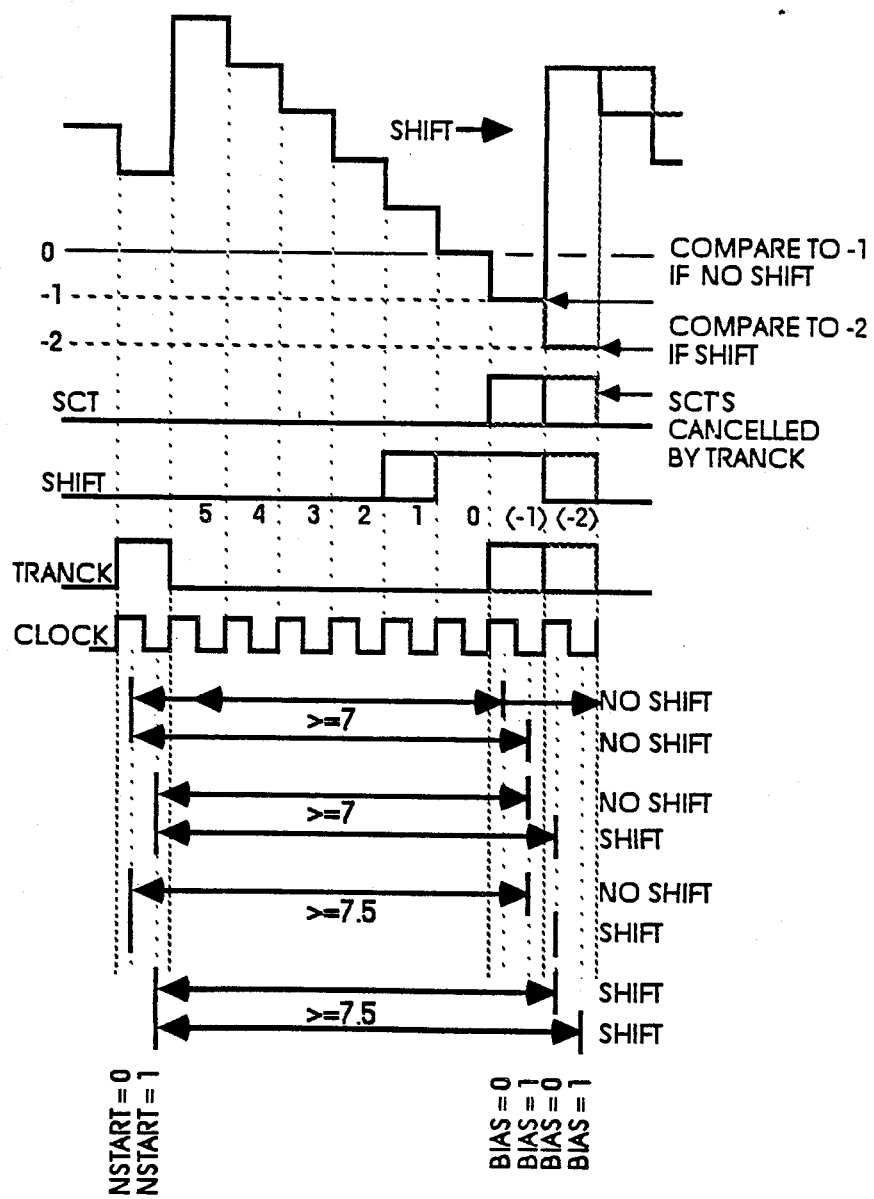
FIG. 4c is a graphical representation illustrating particular examples of when the signal SHIFT is generated.

Without halfclock resolution, what is intended to be 2 3 4 pattern can be transformed into a 3 3 3 pattern. Such error can occur since data can only be sampled on the rising edge of the clock. Thus, if a first RDDATA pulse occurs just after the rising edge of the clock and a second RDDATA pulse occurs just prior to the rising edge of the clock, almost one full clock of error has been introduced in the length of the cell. This problem can be reduced by determining which half of the clock cycle the RDDATA pulse occurred in and shifting the SCT and LCT pulses (as described below) by one count to compensate. Shifting the SCT and LCT pulses will effectively change the distance between TRANCK pulses. The overall effect is that the distance between RDDATA pulses can be resolved to within one half clock of the actual distance instead of one clock. The effective half clock shift of SCT and LCT can take place in two manners. First to compensate for the problem just mentioned and second to allow for better resolution in calculating the parameters for the SCT and LCT counters. FIGS. 4b and 4c show a schematical representation of how a shift signal used by the counters is generated.

Specifically, FIGS. 4b and 4c shows that the TRANCK signal is formed such that it is delayed for four clocks. This pipelining is necessary to be able to know when the TRANCK is going to occur four clocks before it occurs. The RDDATA signal is synchronized to the nearest half clock and then delayed by one clock to generate the signal RT3 as shown in FIG. 4a, which shows a particular implementation of half read logic 41. When the TCK signal becomes valid, RT3 is sampled. If RDDATA occurred in the first half of the clock cycle, RT3 would be a one. If RDDATA occurred in the second half of the clock cycle, RT3 would be zero. This information is then latched in as signal called BIAS. The signal BIAS is set to a zero if RDDATA occurred in the first half of the clock cycle, and is set to a one if it occurred in the second half of the clock cycle. The signal NSTART is used to latch BIAS when TRANCK occurs. This is used on the next RDDATA to determine what has just occurred since the BIAS signal will change on the next TCK. As mentioned above, to avoid introducing errors resulting from the asynchronous nature of the clock signal and RDDATA, it must be known, in advance, whether SCT and LCT should or should not be shifted near a TRANCK. This can now be resolved using the information generated. Since it is known when the TRANCK is going to occur four clocks prior to it actually occurring, and it is known which half of the clock cycle the RDDATA pulse that generated the TRANCK occurred in, and the same information about the previous RDDATA pulse is known, a signal called SHIFT can be generated which will cause the comparison point in the SCT and LCT counters 451 and 453 to be altered by one count thereby correcting to the nearest half clock. The equation for generating SHIFT is $\overline{\text{FRACTION}} * \text{NSTART} * \overline{\text{BIAS}} + \text{FRACTION} * \overline{\text{NSTART}} * \text{BIAS}$. SHIFT is set with TCK1 and reset with TRANCK. FRACTION is the low order bit of the parameter loaded in each of SCT counter 451 and LCT counter 453.

Post Compensation Logic 45

Figure 5:
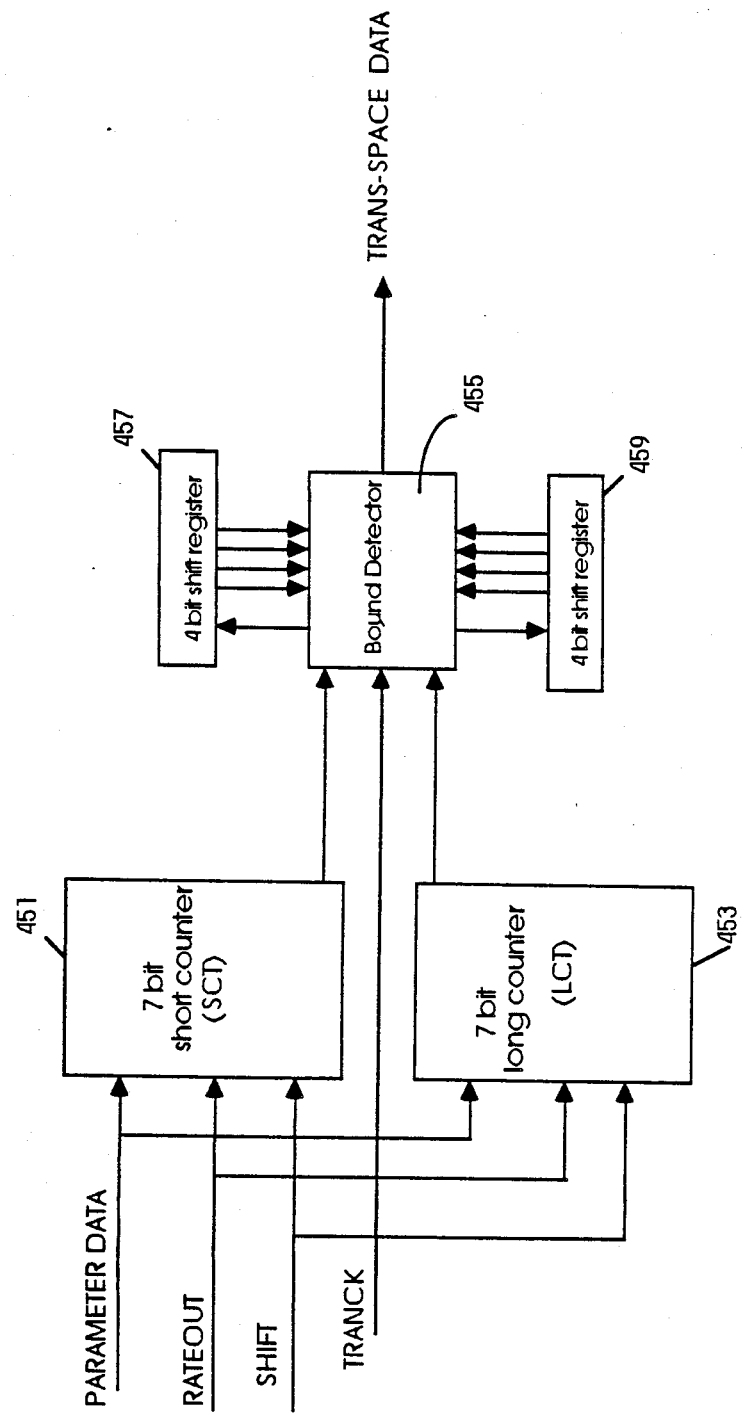
FIG. 5 is a detailed block diagram of post compensation logic 45.

Post compensation logic 45 corrects errors caused by the effects of peak shifting. A detailed block diagram of post compensation logic 45 is shown in FIG. 5.

Post compensation logic comprises two 7-bit counters 451 (SCT) and 453 (LCT), a bound detector 455 and two 4-bit shift registers 457 and 459. The counters are used to place pulses at certain time intervals between transitions. The presets of these counters are the parameters SSL, SSS, SLL, SLS, RPT, CSLS, LSL, LSS, LLL and LLS which are programmed by the software and enable the controller to handle various cell times. The SCT counter 451 loads parameters which are calculated to represent a cell which has a short cell (i.e. 2 unit) following it. The LCT counter 453 loads parameters which are calculated to represent a cell time which has a long cell (i.e. 3 or 4 unit) following it. Additionally, the parameters loaded depend on the previous cell time. In this connection, the counter parameters SSS, LSS, SLS and LLS are used by the SCT counter and the SSL, LSL, SLL and LLL parameters are used by the LCT counter. (The letters represent Long or Short previous/current/next cell times; e.g., the SSL parameter is used when the previous, and current cell times are short and next cell time is long.) RPT is the maximum number of clocks which may occur before a valid transition. CSLS is an addition correction used by the postcompensation logic under certain conditions. The following describes how the parameters are calculated.

The parameters are calculated based on the clock frequency and cell times. Therefore it is required to know both of these factors before calculating parameters. For calculating post compensation parameters, it is required to know the amount of peak shift. This factor can be expressed as a percentage of the minimum cell time MIN. The first step in calculating the parameters is to determine the number of clocks (Nclks) for each of the three cell times. This is done as follows:

Nclks = length of cell (in s) * clock frequency (in Mhz).

The three different cell times will be defined as Nclk1, Nclk2 and Nclk3. The MIN parameter is defined to be the minimum value that a cell must be. This value is arbitrarily placed at the midpoint between between zero and the first transition time. Therefore, MIN = Nclk1/2

The rest of the parameters are calculated in a similar fashion such that the bounds will be placed at the midpoint between two cell times. The only difference is that there is a different amount of peak shift for different combinations of cell times next to each other making it necessary to compensate differently for each. The amount of peak shift per edge can be calculated as follows:

peak shift = PS = % peak shift (per minimum cell time) *Nclk1

This number represents the number of clocks that an edge is affected if a 2 unit cell is next to a 3 or 4 unit cell or vice versa. With this in mind, the remaining parameters can be calculated as follows:

```
SSS = (Nclk1 + Nclk2)/2 − INT(MIN) − PS
SSL = (Nclk1 + Nclk2)/2 − INT(MIN)
LSS = (Nclk1 + Nclk2)/2 − INT(MIN)
LSL = (Nclk1 + Nclk2)/2 − INT(MIN) + PS
SLS = (Nclk2 + Nclk3)/2 − INT(SSS) − 2*PS
SLL = (Nclk2 + Nclk3)/2 − INT(SSL) − PS
LLS = (Nclk2 + Nclk3)/2 − INT(LSL) − PS
LLL = (Nclk2 + Nclk3)/2 − INT(LSL)
```

-continued

CSLS = SLL − INT(LSL)

The RPT parameter is simply a maximum bound check. Therefore, its value is not constrained to a particular value, but it must meet the following requirement:

RPT = > (Nclk3 − Nclk2) + 2*PS

These values must be converted to hexidecimal (Hex) since they represent presets to binary counters. This is done by rounding each value to the nearest half and converting the integer portion into its Hex equivalent value. This value is mapped into the upper 7 bits of the corresponding 8 bit parameter. The low order bit (FRACTION) is set to a one if the fractional part of the number is one-half, otherwise it is set to a zero.

The use of the parameters will now be described with reference to a particular example.

Assume:
Fclk = 16 Mhz.
Cell times are 4, 6 and 8 s.
Post Comp = 3% of 4 s cell time.
This implies:
NCLK1 = 4 * 16 = 64 Clocks
NCLK2 = 6 * 16 = 96 Clocks
NCLK3 = 8 * 16 = 128 Clocks
PS = 3% * 64 Clocks = 1.92 Clocks
Therefore the parameters are:

| MIN = 64/2 = | 32.00 Clocks |
|---|---|
| SSS = (64 + 96)/2 − 32 − 1.92 = | 46.08 Clocks |
| SSL = (64 + 96)/2 − 32 = | 48.00 Clocks |
| LSS = (64 + 96)/2 − 32 = | 48.00 Clocks |
| LSL = (64 + 96)/2 − 32 + 1.92 = | 49.92 Clocks |
| SLS = (96 + 128)/2 − 46 2*1.92 = | 62.16 Clocks |
| SLL = (96 + 128)/2 − 48 − 1.92 = | 62.08 Clocks |
| LLS = (96 + 128)/2 − 48 − 1.92 = | 62.08 Clocks |
| LLL = (96 + 128)/2 − 49 = | 63.00 Clocks |
| RPT = 128 − 96 + 2*1.92 = | 35.84 Clocks |

Converting these parameters to Hex yields the following:
MIN = $40
SSS = $5C
SSL = $60
LSS = $60
LSL = $64
SLS = $7C
SLL = $7C
LLS = $7C
LLL = $7E
RPT = $48

The other dynamically programmable parameters are calculated as follows:

| MULT (K) = | (256*256)/(32*Nclk1) |
|---|---|
| TIME1 = | Nclk1 |
| TIME0 = | Nclk1 /2 |
| NORM = | Arbitrary |
| LATE = | NORM + Pre Comp * Nclk1 |
| EARLY = | NORM − Pre Comp * Nclk1 |

Pre Comp is selectable by the software as a percentage of the MIN cell time.

Bound detector 455 counts the number of pulses which occur between TRANCK transitions. If one pulse occurs between transitions, then the cell must be a two unit cell, if two pulses occur between transitions then the cell must be a three unit cell, and if three pulses occur between transitions then it must be a four unit cell.

The reason for having two counters is that depending on whether the next cell is long (a 3 or 4 unit cell) or short (a 2 unit cell) the pulses may occur in different positions because, for example, a 3 unit cell will be shorter when next to a 2 unit cell than when next to a 3 or 4 unit cell. If both counters generate the same number of pulses between transitions, then bound detector 455 simply generates a space (a 0) for each pulse and a transition (a 1) at the end of the transition time. Such output is referred to herein as the trans-space data pattern. If the two counters generate a different number of pulses between transitions, then the length of the current cell cannot be determined until the next transition time is determined.

Two 4-bit shift registers 457 and 459 keep track of what has happened until the next cell has been determined, thus making it possible to determine the length of the uncertain cell.

Correction State Machine 55

Correction state machine 55 corrects systematic errors such as those caused by a drive that runs too fast or too slow or by an inaccurate clock. A state machine diagram of correction state machine 55 is shown in FIG. 6.

In MFM format, the beginning of a sector or track can be located by finding the 12 bytes of zeros followed by the mark byte. In the present invention, correction state machine 55 is used to sync-up on the bytes of zeroes followed by the mark byte.

Specifically, the state machine looks for a string of minimum cells by looking at the number of SCT pulses that occur between TRANCK pulses. If the state machine sees 64 cells which have only one SCT pulse between transitions, then it knows that it has found a region of minimum cells. The machine then looks to see if the first non-minimum cell is part of a mark byte. If this is the case then the rest of the bits start shifting into the shift register 51 and FIFO 57 will begin functioning. Otherwise the state machine will go back into the state which looks for a string of minimum cells.

Figure 6:
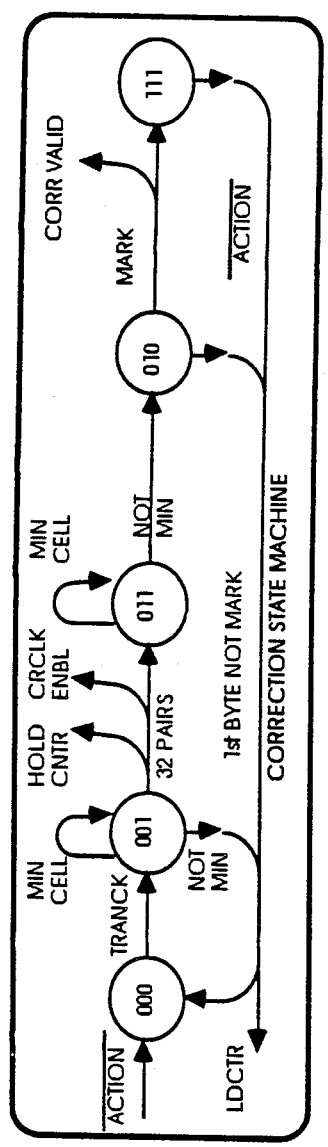
FIG. 6 is a state machine diagram of correction state machine 55.

The state diagram of FIG. 6 shows how correction state machine 55 works. It starts out in the 000 state and stays there until it gets a transition. At this point it goes into the 001 state where it stays until it encounters 32 minimum cells. If 32 pairs of minimum cells are then counted, the machine proceeds on to the 010 state, otherwise it goes back to look for another transition. Once it has encountered the 32 pairs, it waits for the first non-minimum transition to occur in state 011. If this non-minimum cell is part of a mark byte, then it proceeds on to the 111 state where it remains until the processor is finished reading bytes. If the non-minimum cell is not part of a mark byte, the state machine goes back to state 000.

Error Correction Logic 56

Figure 7:
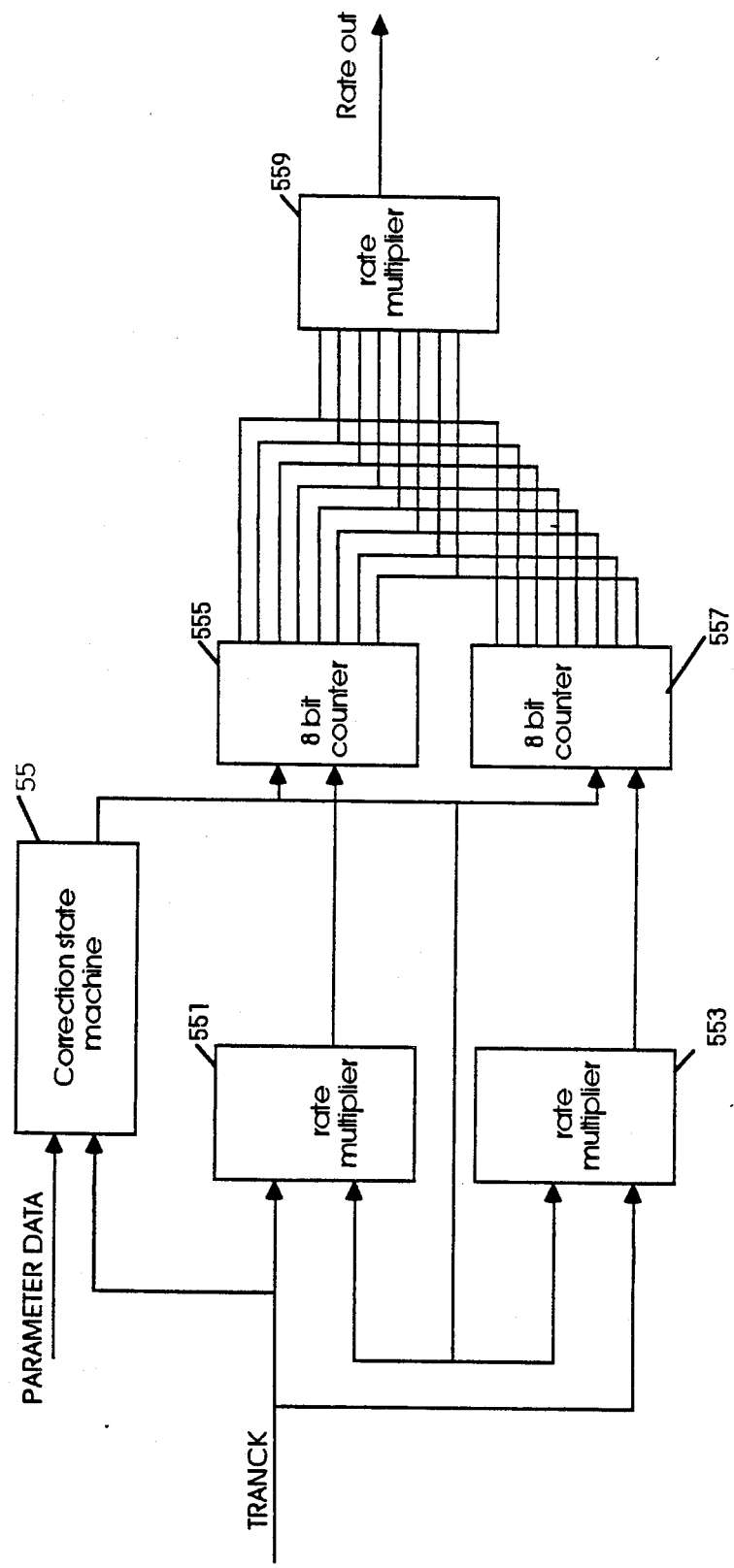
FIG. 7 is a detailed block diagram of error correction logic 56.

Referring now to FIG. 7, during the sync-up period, rate multiplier 551 and 553 count the number of clocks for 32 MIN CELL TIMEs. Upper counter 555 counts the even cells and lower counter 557 counts the odd cells. This make it possible to correct for asymmetry as well as frequency errors. The amount by which the 8-bit counters vary from 256 counts represents the amount of error over the sample. This error number is then applied to post compensation logic SCT counter 451 and LCT counter 453 by stretching or shortening the counts using the output of rate multiplier 559 RATEOUT.

Data Transformation State Machine 49

Data output from post compensation logic 45 is input to read data transformation state machine 49 which converts the data into actual MFM data. Table 2 shows the results of the operation of data transformation state machine 49 for all combinations of trans-space and previous data.

TABLE 2

| PREVIOUS DATA | CURRENT TRANS-SPACE | RESULT |
|---|---|---|
| 1 | (1) | 1 |
| 1 | (01) | 0 |
| 1 | (001) | 01 |
| 0 | (1) | 0 |
| 0 | (01) | 01 |
| 0 | (001) | 00 |

The actual data (i.e., after transformation by data transformation state machine 49) is input to serial-to-parallel shift register 51 which shifts out CRC bytes, mark bytes and data bytes as parallel data. The eight bit actual data, is transferred to FIFO 57 which is a two byte FIFO comprising two 10 bit registers. CRC logic 59 is implemented as the CRC polynomial $X^{16}+X^{12}+X^5+1$. Mark logic 61 is implemented as a state machine which generates a logic 1 when a mark byte is detected.

Write Logic Block 27

Figure 8:
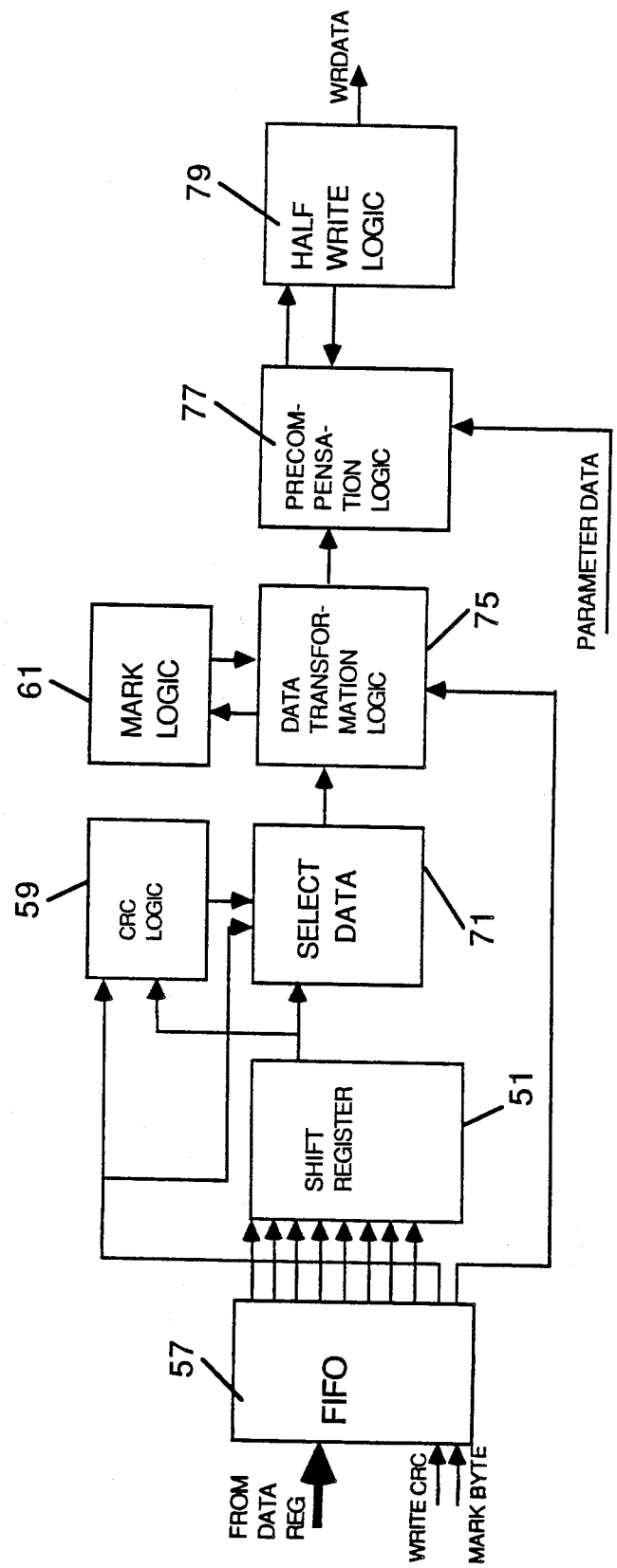
FIG. 8 is an overview block diagram of write logic 27.

FIG. 8 is an overview block diagram of write logic 27, including the applicable portions of FIFO, CRC and mark logic block 24.

The following will describe how data from the processor is translated into 2, 3 and 4 unit cells for writing to the disk.

The write process begins when a processor writes a byte into the data register and sets the Action bit in the mode register. The byte which is written in the data register is loaded into FIFO 57. FIFO 57 is a two byte FIFO consisting of three ten bit registers. The first ten bit register is used to grab the data from the data register and the other two are used as FIFO registers. The ten bit FIFO consists of eight bits of data, a bit which indicates whether the data is a mark byte and a bit which tells the controller to write the CRC bytes.

As shown in FIG. 8, write logic 27 includes FIFO 57, shift register 51, CRC logic 59, and mark logic 61. While each of the foregoing components can be separately implemented, in the preferred embodiment of the subject invention, such elements are shared between read logic 21 and write logic 27 as part of FIFO, CRC and mark logic block 24. Of course, in performing a write, shift register 51 is a parallel to serial shift register rather than a serial to parallel shift register as is the case when doing a read. Similarly, during a write, CRC logic 59 calculates a CRC byte to be written rather than calculating a CRC byte to compare with one which has been read. Similarly, mark logic 61, when in write mode causes a mark byte to be written.

Select Data 71

The serial data output from shift register 51 is input to select data block 71 which, in effect, multiplexes between the actual data and the CRC byte produced by CRC logic 59, outputting the data or CRC byte to data transformation logic 75.

Write Data Transformation Logic 75

Write data transformation logic 75 translates the data stream into a form in which a 1 represents a transition and a 0 represents a space which is the form suitable for writing on a magnetic disk.

Figure 9:
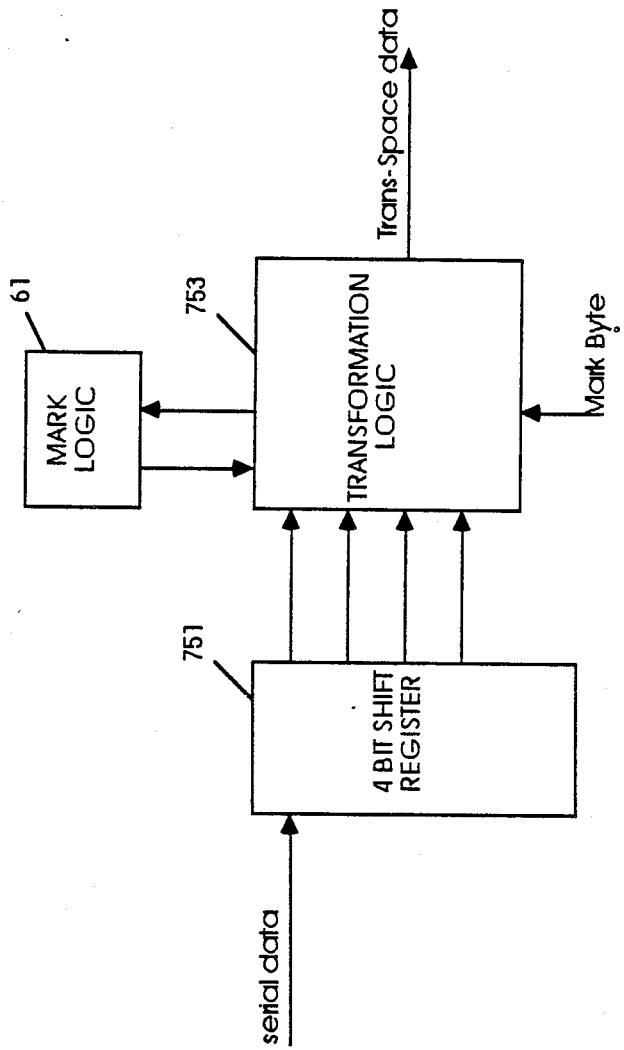
FIG. 9 is a block diagram of write data transformation logic 75.

A block diagram of write data transformation logic 75 is provided in FIG. 9. As shown in FIG. 9, the front end of data transformation logic 75 is a four bit shift register 751 which makes it possible to know what the last two bits were, the current bit is, and the next bit will be. Most of the time, the only information needed is what the current bit is and what the next bit will be. The exception is when writing the mark byte. In this instance, more information is needed because it must be determined when to leave out the transition. As noted above, the only time a transition needs to be skipped is when there is a 1 0 0 0 pattern. Thus, all four bits of information are needed. Table 3 shows the desired transformation of the data performed by transformation logic 753.

TABLE 3

| CURRENT BIT | NEXT BIT | TRANSFORMED DATA | MARK |
|---|---|---|---|
| 0 | 0 | 1 | 00 |
| 0 | 1 | 01 | 01 |
| 1 | 0 | 0 | 0 |
| 1 | 1 | 1 | 1 |

Precompensation Logic 77

Precompensation logic 77 compensates for the problems created by peak shifts as described above with respect to read logic 21. Precompensation logic 77 performs the analog of post compensation logic 45 for write operations. A detail block diagram of precompensation logic 77 is shown in FIG. 10.

Precompensation logic 37 comprises multiplexors 771, 773 and 775, 7-bit counter 777, latch register 779, AND gate 781, comparator 783, AND gate 785, shift register 787 and XOR gate 789.

Figure 10:
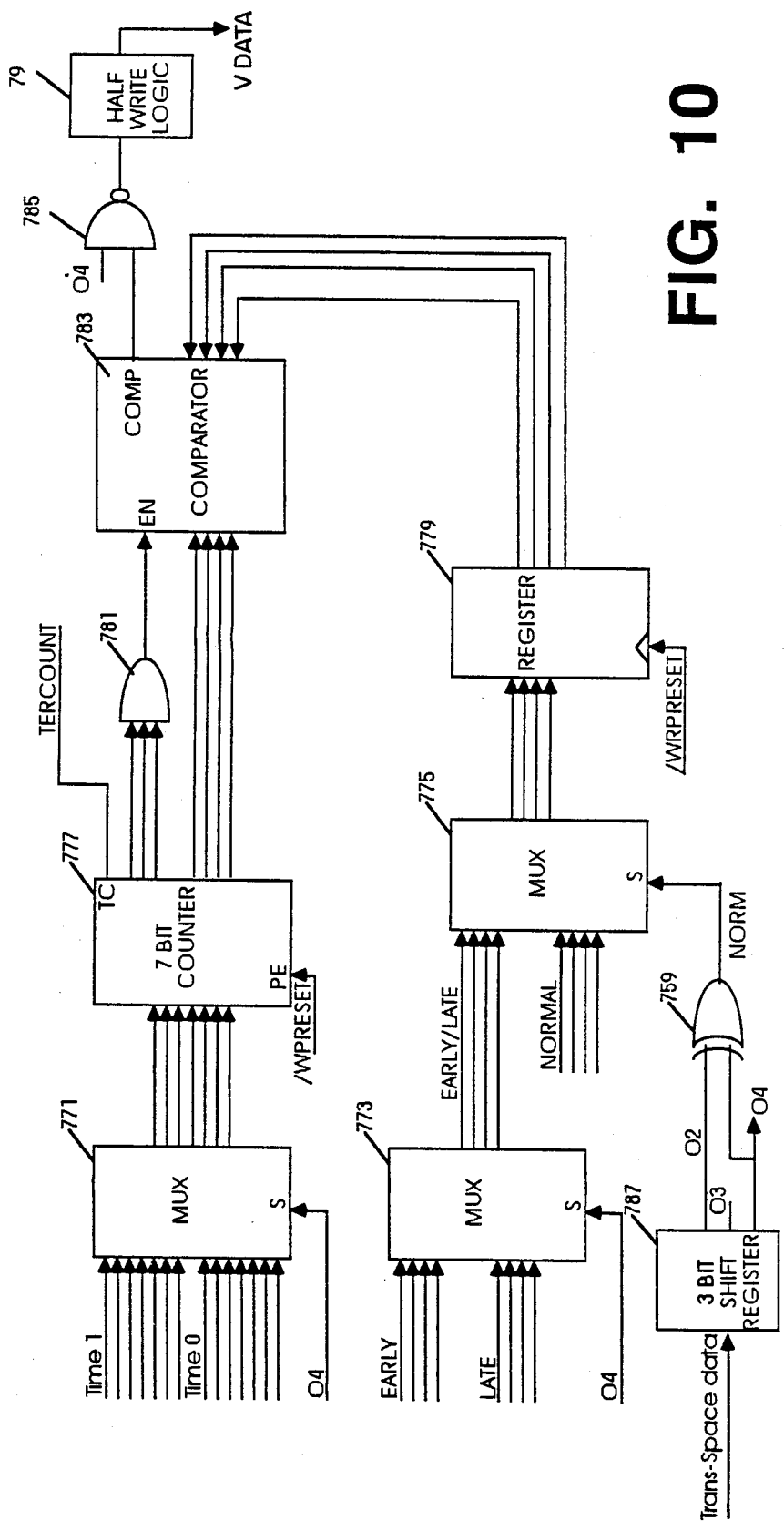
FIG. 10 is a detailed block diagram of precompensation logic 77.

The 7-bit counter 777 shown in FIG. 10 is used for counting out the desired cell times. The counter is preset to either TIME1 if a transition is occurring, or TIME0 if a space is occurring. When the counter reaches the value of the comparison number, then the transition is fed to the half-write logic 79 if the high bit of the shift register 787 is a 1 (indicating a transition). By changing the comparison point, it is possible to stretch or shorten a cell time thereby performing precompensation. The decision whether the transition should be early or late is decided by whether a transition is about to take place. The decision whether the transition should be placed at its nominal value or at a corrected value is made by looking at what the next cell is going to be, thus knowing whether the next cell is a similar type cell. Shift register 787 provides the ability to look at what is coming next in order to determine what to do with the current transition. The outputs of shift register 787 are O4 (current data), O3 (next data), and O2 (next, next data).

Inasmuch as the length of cells to be written are not exact multiples of the clock frequency, additional errors may be introduced. For example, in a four microsecond cell, when a 7.16 Mhz clock is used, the number of clocks in the cell is 28.64. While the output from precompensation logic 77 can be used to write to the disk, it is necessary to round the cell length to an integral number of clocks. This round off forces the cell times to vary from the desired values. Depending upon the clock used, it is possible for significant errors to result. In order to reduce this round off effect, the present invention utilizes half write logic 79 which works on both edges of the clock and creates the effect of having half clock resolution. Writing using half clocks can be very difficult because of the high effective clock speeds generated. For this reason, half write logic 79 is performed just prior to writing the data to the disk.

Half Write Logic 79

Figure 11:
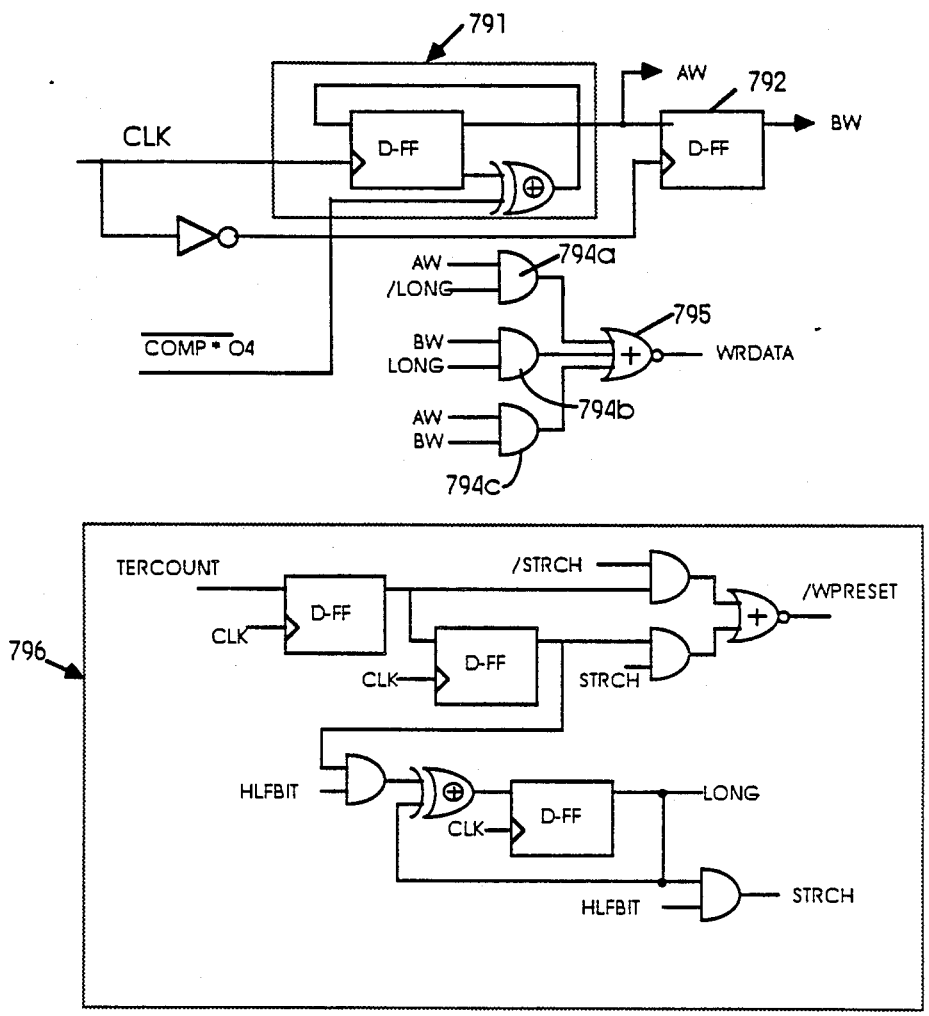
FIG. 11 is a detailed block diagram of half write logic 79.

A detailed block diagram of half write logic 79 is shown in FIG. 11.

Once a comparison point has been reached and the trans-space data is a 1, then a transition is generated by toggling the WRDATA line to the drive. This is done by toggling T-counter 791. This toggle is subsequently delayed by one half clock using D-flip-flop 792. The resulting WRDATA signal is then generated by selecting either the half clock signal BW or non-half clock signal AW thus producing half clock resolution in the WRDATA signal according to the logic performed by and gates 794a, 794b and 794c and NOR gate 795. The HLFBIT signal is what determines whether to cause half clock shifts or not. In particular, logic circuit 796 will cause the LONG signal to toggle on each transition only allowing half-shifts on alternate edges.

What is claimed is:

1. In an improved disk drive controller for controlling the transfer of data between a computer and a disk drive, said computer including a clock for generating clocking signals, an address bus and a data bus, said controller including read logic means for converting data received from a signal generated by the drive to data for placement on the data bus, and write logic means for converting data on the data bus to a signal for recording on magnetic media by the drive, the improvement wherein said read logic means includes means for processing the signal received from the drive to compensate for the effects of peak shift and wherein said peak shift compensation means comprises:

(a) first counter means and second counter means for placing pulses at predetermined time intervals between transitions in said signal from said drive, said predetermined time intervals being determined by setting said first and second counter means with values generated by said computer as a function of the time between previous transitions in said signal from said drive, wherein said first counter means is set with a value corresponding to the shortest expected time between the next two transitions and the second counter means is set to a value greater than the shortest expected time between the next two transitions and less than the maximum expected time between the next two transitions;

(b) bound detector means coupled to said first and second counter means for counting the number of pulses generated by said first and second counter means between transitions in said signal from said drive; and (c) first and second shift registers coupled to said bound detector means for storing the number of pulses generated by said first and second counters respectively to enable said bound detector means to generate peak shift compensated pulses from said signal from said drive.

2. A method for performing symmetry and frequency correction on a signal from a disk drive, said disk drive for coupling to a controller, said controller for coupling to a computer, said signal having transitions which are converted by the controller into data usable by the computer, said method comprising the steps of:

(a) summing the distances between the leading edges of alternate pairs of said transitions;

(b) normalizing said summed distances;

(c) subtracting said normalized distances from predetermined values to produce a correction magnitude and direction;

(d) using said correction magnitude and direction to generate a pulse to correct the symmetry and frequency of said signal from said disk drive.

* * * * *